(12) United States Patent
Hart et al.

(10) Patent No.: US 7,197,328 B2
(45) Date of Patent: Mar. 27, 2007

(54) METHOD AND APPARATUS FOR INCREASING SUCCESS RATE OF PUSH-TO-TALK ACCESS IN A MOBILE COMMUNICATIONS NETWORK

(75) Inventors: Thomas B. Hart, West Dundee, IL (US); Ronald T. Crocker, St. Charles, IL (US); John M. Harris, Chicago, IL (US); Shreesha Ramanna, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 77 days.

(21) Appl. No.: 11/070,178

(22) Filed: Mar. 1, 2005

(65) Prior Publication Data
US 2006/0199603 A1 Sep. 7, 2006

(51) Int. Cl.
*H04Q 7/20* (2006.01)
(52) U.S. Cl. .................. 455/522; 455/69; 455/13.4
(58) Field of Classification Search ............ 455/67.11, 455/67.13, 68, 69, 522, 72, 450, 39, 507, 455/509, 13.4, 466, 518; 370/329, 335, 342, 370/349, 348, 473
See application file for complete search history.

(56) References Cited
U.S. PATENT DOCUMENTS 5,537,414 A * 7/1996 Takiyasu et al. ............ 370/347
6,101,179 A * 8/2000 Soliman ..................... 370/342
6,275,478 B1 * 8/2001 Tiedemann, Jr. ............ 370/318
6,366,779 B1 * 4/2002 Bender et al. .............. 455/450
6,542,488 B1 * 4/2003 Walton et al. .............. 370/335
6,711,150 B1 * 3/2004 Vanghi ....................... 370/342
6,967,935 B1 * 11/2005 Park et al. .................. 370/320
7,024,217 B1 * 4/2006 Hunzinger .................. 455/510
2004/0072541 A1 * 4/2004 Morgan et al. ............... 455/70

* cited by examiner

Primary Examiner—Jean Gelin

(57) ABSTRACT

A method and computer program for initiating a message to a radio access network include steps of: (404) detecting a request to transmit a probe message from a transmitter over an access channel to a radio access network; (406) calculating a transmit power for the probe message; (408) checking a condition that may result in failure to receive the probe message over the access channel by the radio access network; and (410) when the condition is determined to be true, then (412) reducing a message length of the probe message to generate a shorter probe message; (414) recalculating the transmit power to send the shorter probe message; and (416) transmitting the shorter probe message over the access channel at the recalculated transmit power.

17 Claims, 4 Drawing Sheets

METHOD AND APPARATUS FOR INCREASING SUCCESS RATE OF PUSH-TO-TALK ACCESS IN A MOBILE COMMUNICATIONS NETWORK

FIELD OF THE INVENTION

The present invention relates generally to communications systems. More specifically, but without limitation thereto, the present invention relates to a method and apparatus for decreasing connect time and improving the success rate of short message service (SMS) communications such as push-to-talk (PTT) based services from mobile stations to a radio access network (RAN).

BACKGROUND OF THE INVENTION

In a typical radio communications system, setting up a push-to-talk (PTT) call, transmitting the initial session initiation protocol (SIP) INVITE in a short data burst (SDB) or a RECONNECT with a short data burst over the reverse enhanced access channel (R-EACH) can significantly reduce end-to-end call set-up time. However, these messages are significantly longer, perhaps five to six times longer, than other types of access channel messages. Consequently, INVITE and RECONNECT are much more susceptible to transmission errors and therefore require higher data rates over the reverse enhanced access channel, up to 38.4 Kbps. The higher data rates in turn require higher transmit power. Because the mobile stations have limited available transmit power, the performance of the communications system becomes reverse link limited when the mobile station is near the edge of a cell sector.

DESCRIPTION OF THE SEVERAL VIEWS OF THE DRAWINGS

The following drawings are presented by way of example and not limitation, wherein like references indicate similar elements throughout the several views of the drawings, and wherein.

Elements in the figures are illustrated for simplicity and clarity and have not necessarily been drawn to scale. For example, the dimensions, sizing, and/or relative placement of some of the elements in the figures may be exaggerated relative to other elements to clarify distinctive features of the illustrated embodiments. Also, common but well-understood elements that are useful or necessary in a commercially feasible embodiment are often not depicted in order to facilitate a less obstructed view of the illustrated embodiments.

DESCRIPTION OF THE ILLUSTRATED EMBODIMENTS

The following description is not to be taken in a limiting sense, rather for the purpose of describing by specific examples the general principles that are incorporated into the illustrated embodiments. For example, certain actions or steps may be described or depicted in a specific order of occurrence, however, practitioners of the art will understand that the specific order is not a requirement. Also, the terms and expressions used in the description have the ordinary meanings accorded to such terms and expressions in the corresponding respective areas of inquiry and study except where other meanings have been specifically set forth herein.

Pursuant to the following teachings, a given platform detects a request to transmit a probe message from a transmitter over an access channel to a radio access network. A transmit power is calculated from various parameters to use for sending the probe message over the access channel, and a condition is checked that may result in failure to receive the probe message over the access channel by the radio access network. When this condition is determined to be true, then the message length of the probe message is reduced to generate a shorter probe message and the transmit power is recalculated for the shorter probe message.

A probe message configured and arranged as described in the following embodiments has a greater probability of being successfully received by the radio access network than the original probe message, thereby improving the success rate and decreasing the wait time of the radio communications system, especially for push-to-talk access channel communications.

Figure 1:
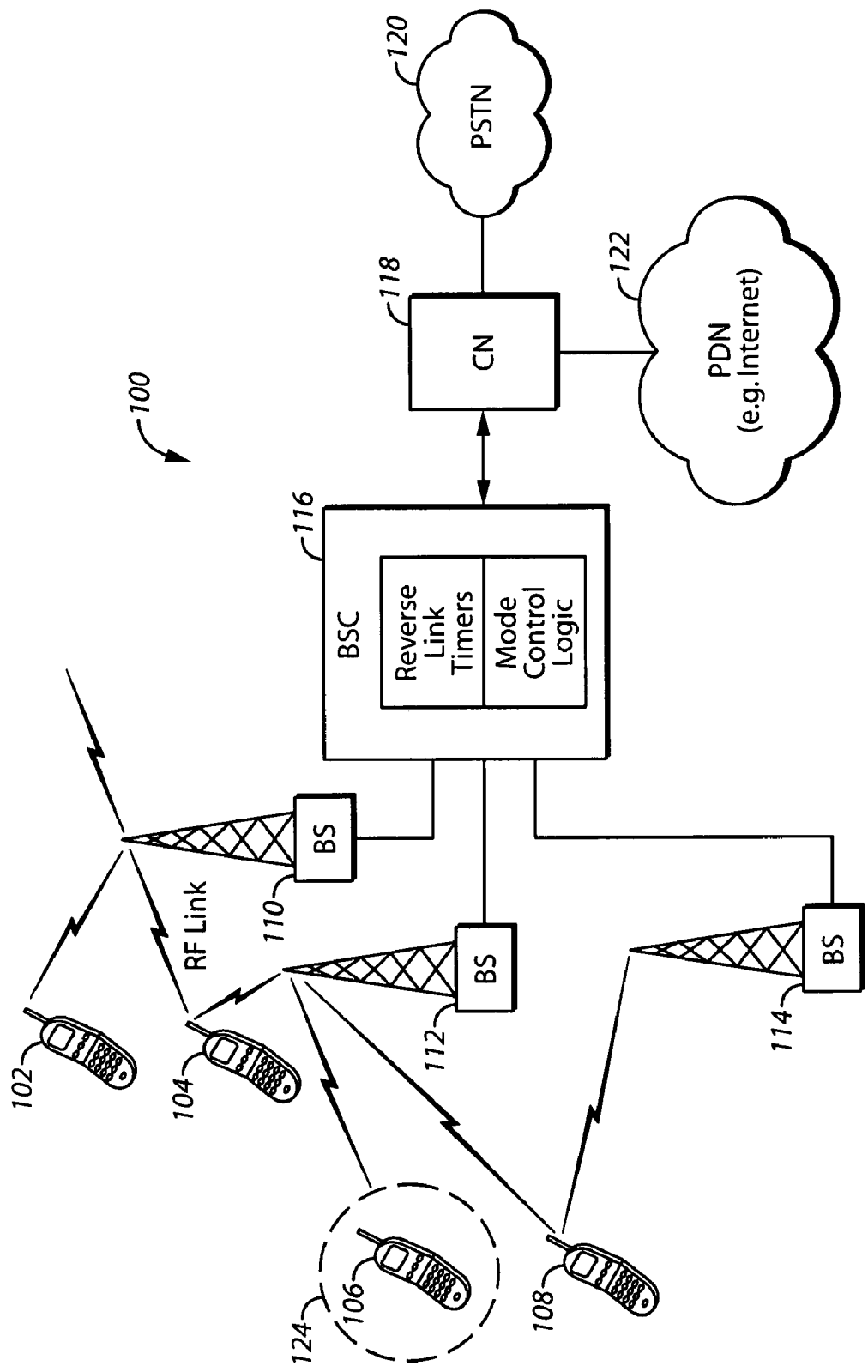
FIG. 1 illustrates a mobile station at the edge of a sector of a mobile communications system according to the prior art.

Prior to describing various embodiments for improving the success rate for push-to-talk access channel communications, certain relevant aspects of previous radio communications systems are briefly described. FIG. 1 illustrates a mobile station at the edge of a sector of a mobile communications system 100 according to the prior art. Shown in FIG. 1 are a plurality of mobile stations 102, 104, 106, and 108, a number of base stations 110, 112, and 114, a base station controller 116, a core network (CN) 118, a public switch telephone network (PSTN) 120, a packet data network (PDN) 122, and a cell sector 124.

The base stations 110, 112, and 114, and the base station controller 116 constitute the radio access network in the mobile communications system 100. Each of the mobile stations 102, 104, 106, and 108 may be, for example, a cellular telephone or a computer device that includes a central processing unit (CPU) a computer memory, a transmitter, and a receiver. Each of the mobile stations 102, 104, 106, and 108 communicates over a radio frequency (RF) link with one of the base stations 110, 112, and 114 covering the service area of the corresponding mobile station 102, 104, 106, and 108. For example, the service area of the base station 112 includes the indicated cell sector 124. Each of the base stations 110, 112, and 114 is supervised by the base station controller (BSC) 116. The base station controller 116 is connected to the core network 118, which provides a gateway, for example, to the public switch telephone network 120 and the packet data network 122. The packet data network 122 may be, for example, an intranet or an extranet such as the Internet. The core network 118 includes, but is not limited to, any message distribution point, for example, an application server. The mobile stations 102, 104, 106, and 108 may be, for example, any combination of cellular telephones, palm top computers, and/or other devices used for communicating messages in a mobile communications system. The mobile communications system 100 is preferably configured for CDMA-2000, however, other protocols may be used to practice various embodiments of the method described below within the scope of the appended claims.

In the example of FIG. 1, each of the mobile stations 102, 104, 106, and 108 communicates with the base stations 110, 112, and 114 over either a shared access channel or a dedicated channel. Under normal channel conditions, shared access channel communications are faster than dedicated channel communications. As the mobile station 106 approaches the edge of the cell sector 124, however, the speed advantage of access channel communications is reduced and may even be reversed. For example, as the received signal strength weakens at the edge of the cell sector 124, an access probe message may have to be repeated to be successfully received, however, using multiple retries of the access probe message to set up a call may result in slower call setup and possibly call failure.

Figure 2:
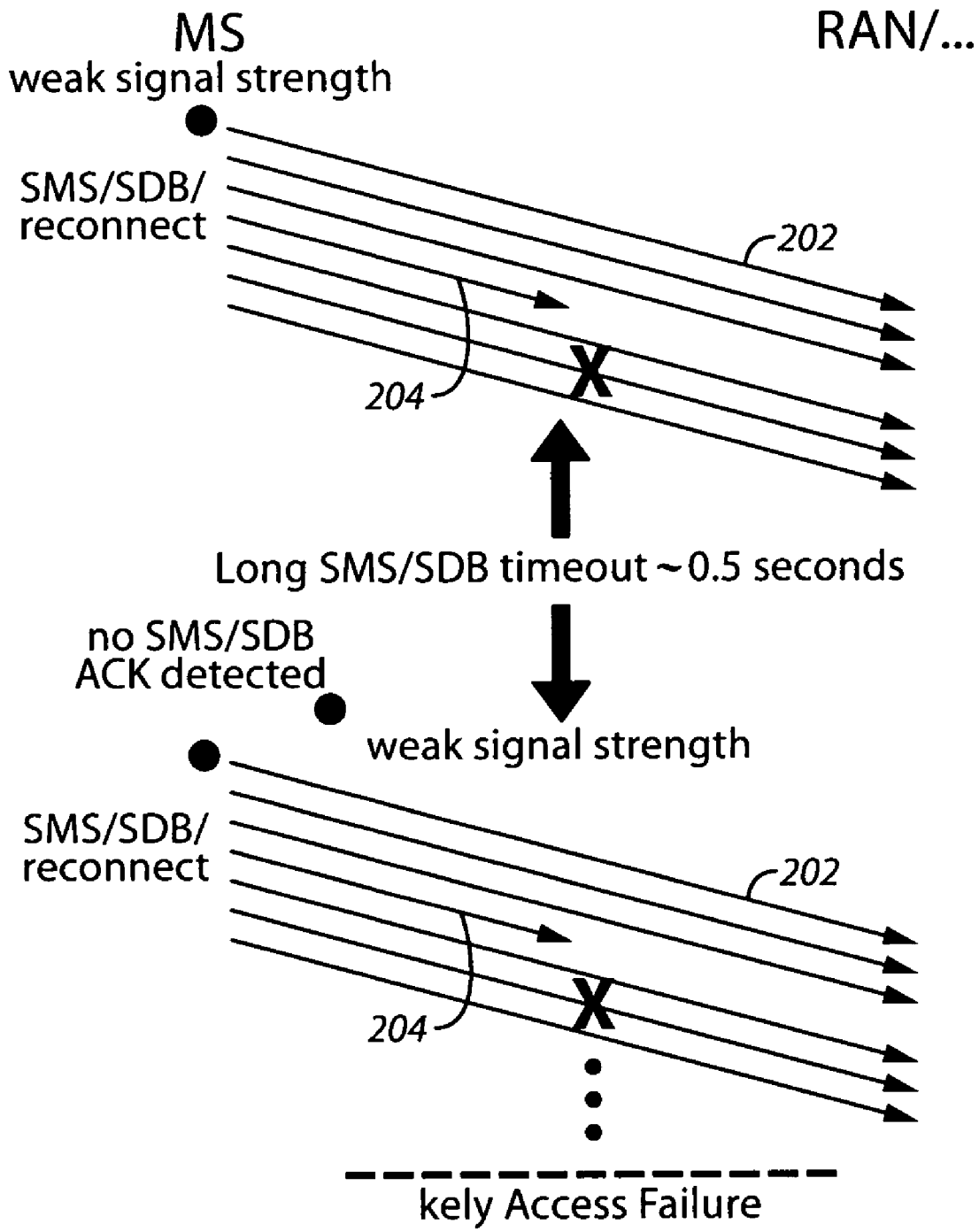
FIG. 2 illustrates a diagram of a typical message transmission from the mobile station of FIG. 1 over an access channel according to the prior art.

FIG. 2 illustrates a diagram of a typical message transmission from the mobile station 106 of FIG. 1 over an access channel according to the prior art. Shown in FIG. 2 are message blocks 202 and an incomplete or corrupted message block 204.

The message blocks 202 are typically short message service (SMS) or short data burst (SDB) blocks having a duration of about 20 milliseconds each. As reception of the message blocks 202 degrades near the edge of the cell sector 124 or due to other access channel factors that may adversely affect access channel performance, more transmit power is needed to maintain a given data rate from the mobile station 106. When the transmit power reaches the maximum available transmit power, then the data rate may be reduced to compensate for the poor channel conditions. However, reducing the data rate requires reducing the block size to maintain the specified block duration of 20 milliseconds, resulting in an increased number of blocks. Increasing the number of blocks increases the probability that at least one of the blocks will be an incomplete or corrupted message block 204, resulting in degraded performance.

The incomplete or corrupted message block 204 is detected by the absence of an acknowledgment from the radio access network after a timeout interval of approximately 0.5 second in some systems. The mobile station 106 then increases the transmit power by some increment if the previous transmission was below the maximum available transmit power, and the mobile station 106 retransmits all the message blocks 202 of the entire message in the next available time slot of the access channel. If no acknowledgment is received from the base station 112 before the end of the timeout interval, the transmit power is again increased and the message is re-transmitted as described above up to four times, even if the mobile station 106 has already reached maximum transmit power. As a result, access channel communications become less efficient than dedicated channel communications when a condition exists that may result in a failure of the message to be received correctly at the radio access network.

To maintain the highest data rate near the edge of the cell sector 124 or when the access channel is otherwise adversely affected, it is advantageous to determine when a dedicated channel will perform faster than an access channel. It is also advantageous to have the capability to communicate a DEDICATED CHANNEL REQUEST to the radio access network successfully when the access channel is performing poorly.

Figure 3:
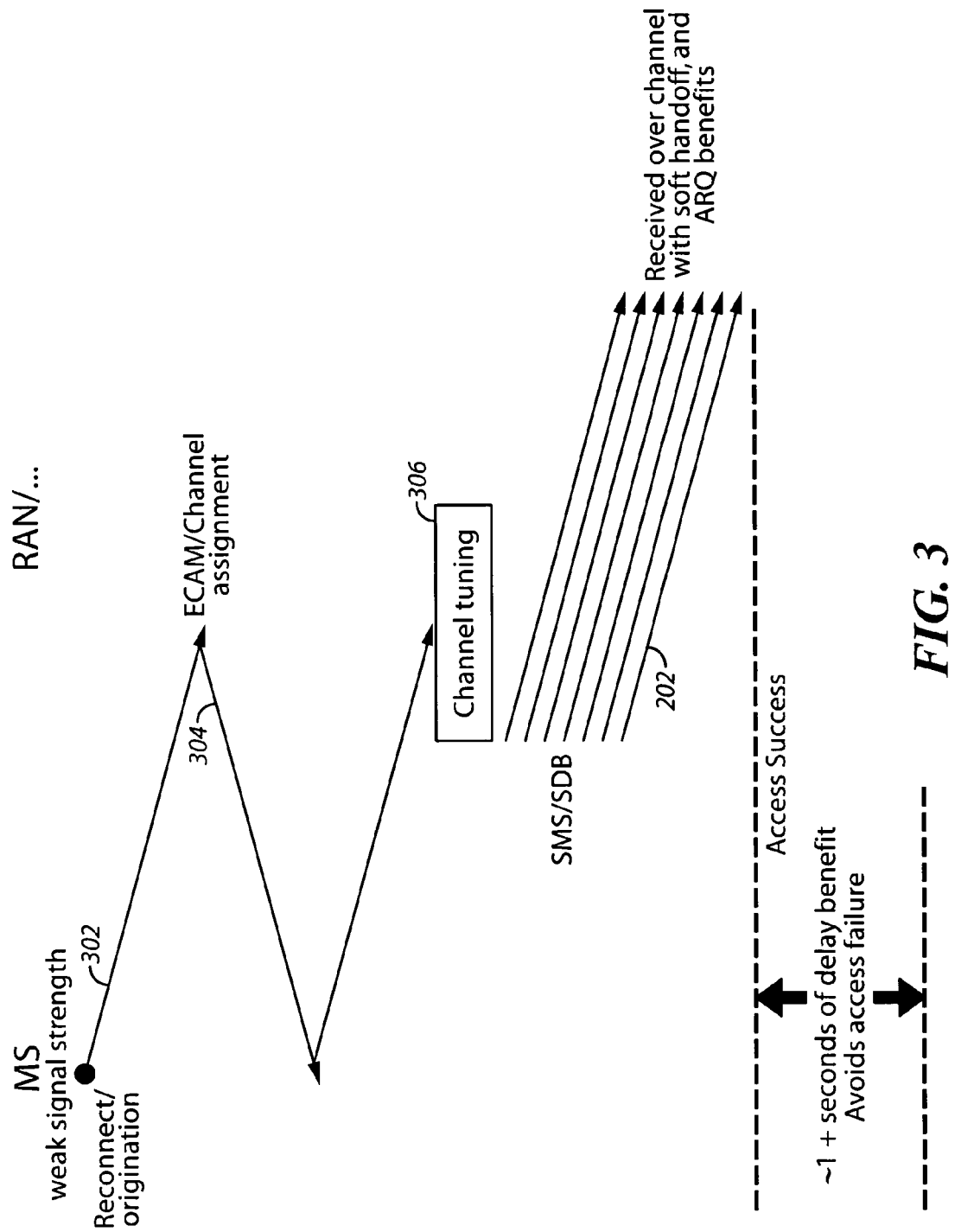
FIG. 3 illustrates a diagram of an illustrative message transmission from the mobile station of FIG. 1 with a reduced message size.

FIG. 3 illustrates a diagram of an illustrative message transmission from the mobile station of FIG. 1 with a reduced message size. Shown in FIG. 3 are message blocks 202, a RECONNECT/ORIGINATION 302, an extended channel assignment message (ECAM)/channel assignment 304, and channel tuning 306.

In FIG. 3, if an adverse access channel condition exists such as a weak pilot signal strength or a low reverse signal strength measured by the received signal strength indicator (RSSI), then the RECONNECT/ORIGINATION 302 or similar probe message is sent to request a dedicated channel. If the probe message is not successfully received, then the probe message is reduced, preferably as much as possible, to generate a shorter probe message. A dedicated channel is set up by the channel tuning 306, and the message blocks 202 are sent over the dedicated channel. During the channel tuning 306, the radio access network sends a series of null data message blocks. When the mobile station 106 detects the null data blocks, a preamble is sent and acknowledged to establish the dedicated channel.

The channel tuning requires from about one to five seconds, which adds significantly to the overhead in using a dedicated channel, however, the dedicated channel provides a much more robust communications channel. For example, the dedicated channel uses multiple towers to communicate with the mobile station 106, radio link protocol (RLP) or radio link control (RLC). Also, individual blocks that are not successfully received by the radio access network are re-transmitted instead of the entire message as when using an access channel. As a result, the number of incomplete or corrupted message blocks 204 is reduced as well as the delay in communicating complete message blocks.

An INVITE is a message used by the subscriber to notify the radio access network of the target of a communication from the subscriber and to invite that target to participate in an ongoing communication. A 200 OK is a type of message typically sent in response to an INVITE received from the target, or possibly from the server on behalf of the target, indicating that the INVITE/communication request has been accepted. Radio link protocol (RLP) and radio link control (RLC) are types of selective repeat protocols that may be established to provide relatively rapid and reliable transport over the wireless link compared to normal access channel. For example, segments of frames that have been corrupted may be retransmitted, providing quick, efficient recovery after frame erasures.

Sending an INVITE over the access channel is faster than over the dedicated channel. However, if the message is sent over the access channel and it fails, then it may have been faster simply to request a dedicated channel, for example, via an origination message, and to send the INVITE over the dedicated channel. This is because the message is less likely to fail or is easier to fix if part of it fails when it is sent over the dedicated channel. The same concept applies to the transmission of the 200 OK by the target over the access channel vs. the dedicated channel. However, if the 200 OK is corrupted when it is transmitted over the access channel, it may be faster for the target to simply send a PAGE RESPONSE to request a dedicated channel over which the target can send the 200 OK. Additionally, the PAGE RESPONSE may be sent in a single message with the 200 OK, which is often referred to as a RECONNECT with bearer message. However, combining the PAGE RESPONSE with the 200 OK results in a larger overall message transmission than just sending the 200 OK, further increasing the probability of corrupting the 200 OK over the access channel. Similarly, the origination message may be combined with the INVITE from the originator. Combining messages in this way may further reduce latency if the access channel message is not corrupted, and may also reduce access channel loading in some cases by reducing the number of messages transmitted on the access channel. However, doing so will increase the probability of the INVITE being corrupted over the access channel. The following method may be used to minimize communications latency by either combining messages over an access channel when a successful reception is likely or sending a short message over the access channel and the remainder over a dedicated channel when a successful reception is unlikely.

Figure 4:
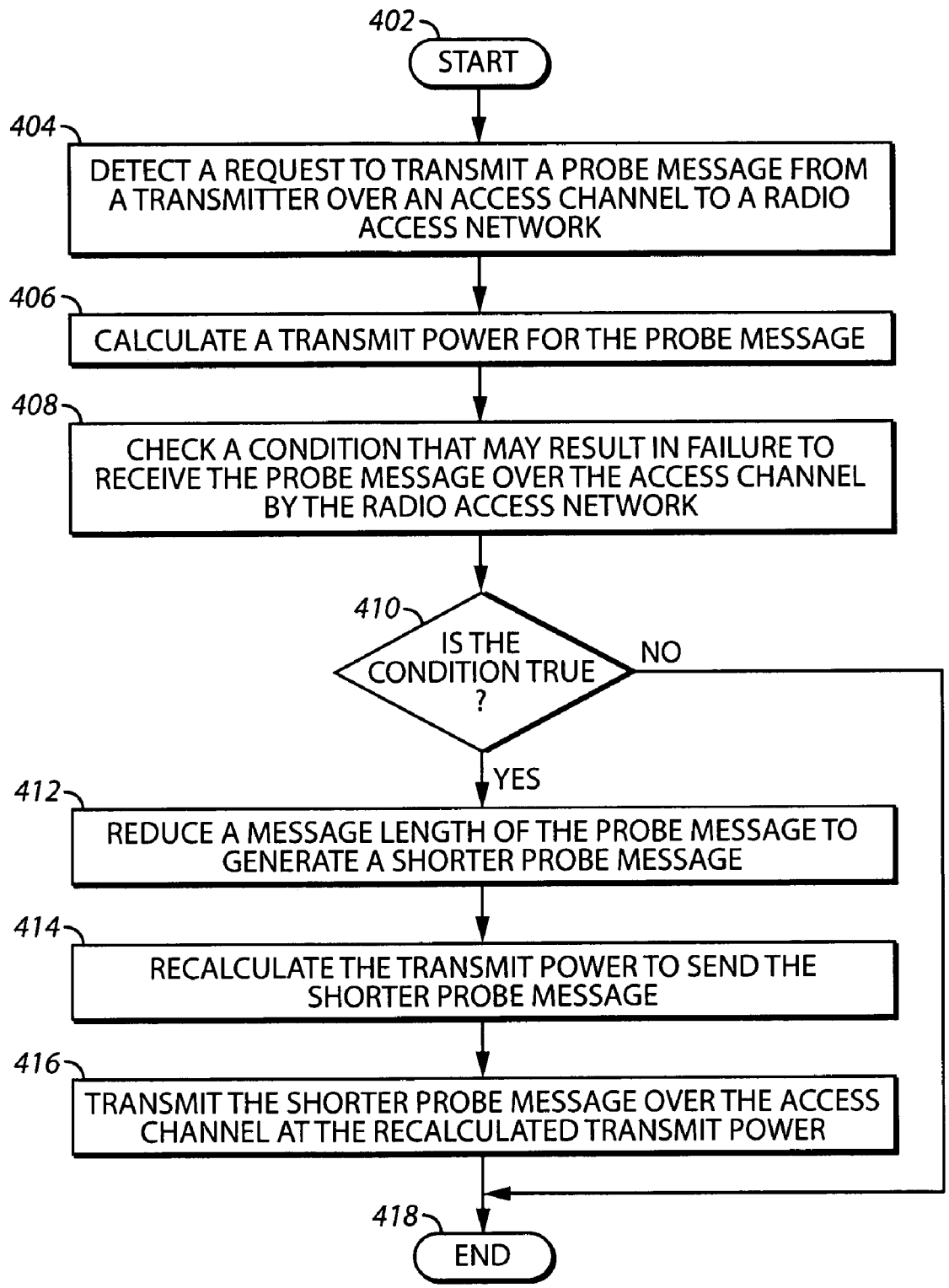
FIG. 4 illustrates a flow chart of an illustrative method of message transmission with reduced message size.

FIG. 4 illustrates a flow chart 400 of an illustrative method of message transmission with reduced message size.

Step 402 is the entry point of the flow chart 400.

In step 404, a request to transmit a probe message from a transmitter over an access channel to a radio access network is detected. For example, the request may be generated by pressing the push-to-talk switch of a mobile station handset.

In step 406, a transmit power is calculated for the probe message. The transmit power is calculated according to well-known techniques based on the message length, the pilot signal strength, and the received signal strength indicator (RSSI).

In step 408, a condition is checked that may result in failure to receive the probe message over the access channel by the radio access network. For example, the condition may be one or more of the following:

(a) if the calculated transmit power is greater than a selected transmit power (the selected transmit power may not exceed the maximum transmit power capability of the transmitter).

(b) if the probe message was previously transmitted more than a selected number of attempts (the selected number of attempts may be set by the radio access network, for example, as a function of message traffic conditions);

(c) if the probe message was previously transmitted unsuccessfully from the same position at the calculated transmit power (if no motion of the mobile station has been detected, for example, by a camera orientation sensor or by other position and movement detectors typically found in mobile stations incorporating navigation tools, then no improvement in the signal conditions due to the position of the mobile station is likely);

(d) if the pilot signal strength of the radio access network is less than a selected pilot signal strength (the selected pilot signal strength may be set by the radio access network, for example, as a function of message traffic conditions);

(e) if the reverse signal strength is less than a selected reverse signal strength (the selected reverse signal strength may be set by the radio access network, for example, as a function of message traffic conditions); and (f) if the probe message has a message length that exceeds a selected message length (the selected message length may not exceed the maximum message length that would be allowed when the condition is false).

In step 410, if the condition is true, then the flow chart continues from step 412, otherwise the flow chart continues from step 416.

In step 412, the message length of the probe message is reduced to generate a shorter probe message. For example, if the probe message is an INVITE and a DEDICATED CHANNEL REQUEST, then the probe message may be reduced by omitting the INVITE so that the shorter probe message is only a DEDICATED CHANNEL REQUEST. The INVITE may be sent in a subsequent message on the dedicated channel. Alternatively, non-critical fields may be omitted to shorten a message. For example, extra target information and extra pilot signal strength information may be omitted from a group call message.

In step 414, the transmit power is recalculated to send the shorter probe message. If the recalculated transmit power is greater than the maximum transmit power of the transmitter, then the recalculated transmit power is set to the maximum transmit power.

In step 416, the shorter probe message is transmitted over the access channel at the recalculated transmit power. In one embodiment, a history of the previous communications over the access or paging/pilot channel may be searched to determine whether there is a periodic pattern of favorable access channel factors. If such a pattern is found, then a subsequent time may be extrapolated from the pattern for transmitting the shorter probe message, thereby improving the probability of receiving the shorter probe message correctly at the radio access network. For example, if the pilot signal strength and the received signal strength indicator both reached a peak every seven seconds, then the shorter probe message may be sent seven seconds after the last peak in the pilot signal strength and the received signal strength indicator.

Step 418 is the exit point of the flow chart 400.

Although the flowchart description above is described and shown with reference to specific steps performed in a specific order, these steps may be combined, sub-divided, or reordered without departing from the scope of the claims. Unless specifically indicated, the order and grouping of steps is not a limitation of other embodiments that may lie within the scope of the claims.

The flow chart 400 of FIG. 4 may also be implemented by instructions for being performed on a computer or other programmable or partially programmable platform. The instructions may be embodied in a disk, a CD-ROM, and other computer readable media according to well-known computer programming techniques.

In another embodiment, a computer program product includes a medium for embodying a computer program for input to a computer and a computer program embodied in the medium for causing the computer to perform steps of:

detecting a request to transmit a probe message from a transmitter over an access channel to a radio access network;

calculating a transmit power for the probe message;

checking a condition that may result in failure to receive the probe message over the access channel by the radio access network; and when the condition is determined to be true, then reducing a message length of the probe message to generate a shorter probe message;

recalculating the transmit power to send the shorter probe message; and transmitting the shorter probe message over the access channel at the recalculated transmit power.

In the example described above, the computer program is performed in the mobile station 106. Alternatively, the computer program may be performed by an application or included in standard (physical layer) CDMA-2000, HRPD, HRPDA, HRPDB, Universal Mobile Telecommunications System (UMTS), or enhanced UMTS.

The specific embodiments and applications thereof described above are for illustrative purposes only and do not preclude modifications and variations that may be made within the scope of the following claims.

What is claimed is:

1. A method comprising steps of:
   detecting a request to transmit a probe message from a transmitter over an access channel to a radio access network wherein the probe message includes at least a signaling portion and a data portion;
   calculating by the transmitter a transmit power to send the probe message;
   checking at the transmitter a condition that may result in failure to receive the probe message over the access channel by the radio access network; and
   when the condition is determined to be true, then
      generating a shorter probe message wherein the shorter probe message includes only the signaling portion of the probe message;
      recalculating the transmit power to send the shorter probe message; and
      transmitting the shorter probe message over the access channel at the recalculated transmit power.

2. The method of claim 1 wherein the transmitter is a mobile station.

3. The method of claim 1 wherein the signaling portion of the probe message comprises at least one of a DEDICATED CHANNEL REQUEST, an ORIGINATION REQUEST, a PAGE RESPONSE, and a RECONNECT REQUEST, and the data portion of the probe message comprises at least one of an INVITE and a 200 OK.

4. The method of claim 1 wherein the condition comprises one or more of the following:
   (a) if the calculated transmit power is greater than a selected transmit power;
   (b) if the probe message was previously transmitted more than a selected number of attempts;
   (c) if the probe message was previously transmitted unsuccessfully from the same position at the calculated transmit power;
   (d) if a pilot signal strength of the radio access network is less than a selected pilot signal strength;
   (e) if a reverse signal strength is less than a selected reverse signal strength; and
   (f) if the probe message has a message length that exceeds a selected message length.

5. The method of claim 4 wherein at least one of the selected transmit power and the selected number of attempts is a function of the probe message length and wherein the selected message length is no greater than a maximum message length that would be allowed when the condition is false.

6. The method of claim 4 wherein at least one of the selected transmit power, the selected number of attempts, the selected pilot signal strength, the selected reverse signal strength, and the selected message length is set by the radio access network.

7. The method of claim 1 further comprising a step of transmitting the data portion of the probe message over a dedicated channel.

8. The method of claim 1 further comprising a step of reducing a message length of the signaling portion of the probe message to generate a shorter signaling message and transmitting the shorter signaling message over the access channel at maximum transmit power.

9. The method of claim 1 further comprising a step of searching for a periodic pattern of favorable access channel factors in a history of previous transmissions to extrapolate a time for transmitting the shorter probe message.

10. The method of claim 1 wherein the shorter probe message comprises only one of an INVITE and a 200 OK.

11. The method of claim 10 further comprising a step of transmitting a DEDICATED CHANNEL REQUEST.

12. The method of claim 1 further comprising a step of transmitting a DEDICATED CHANNEL REQUEST over the access channel to the radio access network when an acknowledgment of the shorter probe message is received within a selected time interval.

13. A computer program product for use with a transmitter comprising:
    a medium for embodying a computer program for input to a computer; and
    a computer program embodied in the medium for causing the computer to perform steps of:
       detecting a request to transmit a probe message from a transmitter over an access channel to a radio access network wherein the probe message comprising at least a signaling portion and a data portion;
       calculating at the transmitter a transmit power for the probe message;
       checking by the transmitter a condition that may result in failure to receive the probe message over the access channel by the radio access network; and
       when the condition is determined to be true, then
          generating a shorter probe message comprising only the signaling portion of the probe message;
          recalculating the transmit power to send the shorter probe message; and
          transmitting the shorter probe message over the access channel at the recalculated transmit power.

14. The computer program product of claim 13 wherein the computer program is performed in a mobile station.

15. The computer program product of claim 13 wherein the signaling portion of the probe message comprises at least one of a DEDICATED CHANNEL REQUEST, an ORIGINATION REQUEST, a PAGE RESPONSE, and a RECONNECT REQUEST, and the data portion of the probe message comprises at least one of an INVITE, and a 200 OK.

16. The computer program product of claim 13 wherein the condition comprises one or more of the following:
    (a) if the calculated transmit power is greater than a selected transmit power;
    (b) if the probe message was previously transmitted more than a selected number of attempts;
    (c) if the probe message was previously transmitted unsuccessfully from the same position at the calculated transmit power;
    (d) if a pilot signal strength of the radio access network is less than a selected pilot signal strength;
    (e) if a reverse signal strength is less than a selected reverse signal strength; and
    (f) if the probe message has a message length that exceeds a selected message length.

17. The computer program product of claim 13 further comprising a step of reducing a message length of the signaling portion of the probe message to generate a shorter signaling message and transmitting the shorter signaling message over the access channel at maximum transmit power.

* * * * *